(12) United States Patent  (10) Patent No.: US 9,098,180 B1
Craig et al.  (45) Date of Patent: Aug. 4, 2015

(54) USER INTERFACE AND METHOD FOR PERSONALIZED RADIO STATION CREATION

(71) Applicant: Panasonic Automotive Systems Company of America, Division of Panasonic Corporation of North America, Peachtree City, GA (US)

(72) Inventors: Larry Vincent Craig, Plymouth, MI (US); David Taylor, Farmington Hills, MI (US)

(73) Assignee: Panasonic Automotive Systems Company of America, division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 14/471,516

(22) Filed: Aug. 28, 2014

Related U.S. Application Data

(60) Provisional application No. 61/871,613, filed on Aug. 29, 2013.

(51) Int. Cl.
*G06F 3/048* (2013.01)
*B60K 37/00* (2006.01)
*G06F 3/0484* (2013.01)
*B60K 37/06* (2006.01)
*G06F 3/0481* (2013.01)

(52) U.S. Cl.
CPC ............ *G06F 3/04847* (2013.01); *B60K 37/06* (2013.01); *G06F 3/04817* (2013.01)

(58) Field of Classification Search
CPC .................. B60K 35/00; B60K 37/06; B60K 2350/1024; B60K 2350/1072; B60K 2350/403; B60K 2350/925; G06F 3/0488; G06F 3/04847; G06F 3/04817; B60R 11/02
USPC .......................................................... 715/833
See application file for complete search history.

(56) References Cited

U.S. PATENT DOCUMENTS

| | | | | |
|---|---|---|---|---|
| 5,392,388 | A  * | 2/1995 | Gibson ......................... | 715/837 |
| 7,518,659 | B2 * | 4/2009 | Iizuka et al. .................. | 348/584 |
| 7,653,883 | B2 * | 1/2010 | Hotelling et al. ............. | 715/863 |
| 7,921,109 | B2 * | 4/2011 | Parikh et al. .................. | 707/731 |
| 7,941,765 | B2 * | 5/2011 | Fleck et al. ................... | 715/834 |
| 7,975,234 | B2 * | 7/2011 | Hamadi et al. ................ | 715/763 |
| 7,995,038 | B2 * | 8/2011 | Vitale et al. ................... | 345/173 |
| 8,250,488 | B2 * | 8/2012 | Szoczei et al. ................ | 715/833 |
| 8,269,718 | B2 * | 9/2012 | Iwamura ....................... | 345/156 |
| 8,306,693 | B2 * | 11/2012 | Tanaka ............................ | 701/36 |
| 8,442,843 | B2 * | 5/2013 | Kneuer et al. .................... | 705/2 |
| D690,717 | S  * | 10/2013 | Thomsen et al. ............ | D14/485 |

(Continued)

OTHER PUBLICATIONS

Kudin, Anton. Viva home. Blog posted Oct. 25, 2012. Retrieved from [http://dribble.com/shots/786997-viva-home] on [Nov. 2, 2014].*

(Continued)

*Primary Examiner* — Amy M Levy
(74) *Attorney, Agent, or Firm* — Laurence S. Roach, Esq.

(57) ABSTRACT

A user interface arrangement includes a user interface having a plurality of movable sliders. Each of the sliders corresponds to a respective category of infotainment content. A processor is communicatively coupled to the user interface. The processor presents each of the categories of infotainment content in proportions dependent upon positions of the sliders.

7 Claims, 6 Drawing Sheets

(56) References Cited

U.S. PATENT DOCUMENTS

| | | | |
|---|---|---|---|
| 8,730,256 B2* | 5/2014 | Vinkenvleugel et al. | 345/590 |
| 8,875,054 B2* | 10/2014 | Hopkins et al. | 715/833 |
| 2002/0041273 A1* | 4/2002 | Dirksen et al. | 345/173 |
| 2003/0234764 A1* | 12/2003 | Noguchi et al. | 345/156 |
| 2005/0172230 A1* | 8/2005 | Burk et al. | 715/716 |
| 2005/0262451 A1* | 11/2005 | Remignanti et al. | 715/833 |
| 2006/0092177 A1* | 5/2006 | Blasko | 345/619 |
| 2006/0265421 A1* | 11/2006 | Ranasinghe et al. | 707/104.1 |
| 2008/0186808 A1* | 8/2008 | Lee | 368/10 |
| 2009/0077499 A1* | 3/2009 | Svendsen et al. | 715/833 |
| 2009/0187860 A1* | 7/2009 | Fleck et al. | 715/834 |
| 2010/0138787 A1* | 6/2010 | Ciatti et al. | 715/810 |
| 2010/0192104 A1* | 7/2010 | Lee et al. | 715/834 |
| 2010/0205532 A1* | 8/2010 | Adhikari et al. | 715/727 |
| 2010/0325583 A1* | 12/2010 | Aarni et al. | 715/833 |
| 2011/0255081 A1* | 10/2011 | De Greeve et al. | 356/237.2 |
| 2012/0030626 A1* | 2/2012 | Hopkins et al. | 715/833 |
| 2013/0127911 A1* | 5/2013 | Brown | 345/649 |
| 2013/0185753 A1* | 7/2013 | Kliot | 725/39 |
| 2013/0307825 A1* | 11/2013 | Czelnik et al. | 345/174 |

OTHER PUBLICATIONS

Kudin, Anton. Radial slider. Blog posted Aug. 20, 2012. Retrieved from [http://dribble.com/shots/695685-radial-slider] on [Nov. 2, 2014].*

Patently Mobile. Microsoft Reveals an All-New Touch Based Interface. Blog posted May 25, 2013. Retrieved from [http://www.patentlymobile.com] on [Nov. 2, 2014].*

Henning "RadialSlider Control", blog post Mar. 21, 2014, retrieved from [http://blog.actiprosoftware.com] on [Mar. 11, 2015] 5 pages.*

* cited by examiner

USER INTERFACE AND METHOD FOR PERSONALIZED RADIO STATION CREATION

CROSS-REFERENCE TO RELATED APPLICATION

This application claims priority to U.S. Provisional Application Ser. No. 61/871,613, filed on Aug. 29, 2013, the disclosure of which is hereby incorporated by referenced in its entirety for all purposes.

BACKGROUND OF THE INVENTION

1. Field of the Invention

The present invention relates to an automotive user interface, and, more particularly, to an automotive user interface that enables a user to select a mix of infotainment content that is readily available via the user interface.

2. Description of the Prior Art

The typical internet radio experience puts the user in an information-free bubble, isolating them from the outside world. Although terrestrial radio broadcast programming often has predicable scheduling of traffic, news, and weather information, the information is delivered on a fixed broadcast schedule, and not on the schedule of the user. Currently, the only safe way to access information of interest when in the car is to tune away from the current stream and access another source. Once the user tunes away from the current stream, there are no longer any opportunities to monetize the user for an indeterminate length of time.

SUMMARY OF THE INVENTION

The invention may provide a user interface and method that enables a user to combine local content (e.g., content that is stored within the vehicle, or content received from terrestrial radio stations) with multiple internet radio stations into a single combined, personalized station stream. In one embodiment, the invention may enable the listener to create his own custom radio station from various music, news, weather, and traffic feeds. The listener may create his custom radio station by adjusting the user interface settings, selecting from a variety of content categories, and thereby creating the desired variety of content. The user interface settings may be saved and recalled for later playback.

The invention may extend the reach of content by making certain content available from different places within either the human machine interface (HMI) of the mobile application, or the in-vehicle infotainment system. In this case, the content may be accessible on demand by using "Traffic Now!" and "Weather Now!" features which may enable the user to access traffic information and weather information by pressing a pushbutton or touching an on-screen icon. This feature cannot be delivered by either terrestrial or satellite radio, and provides an opportunity to monetize the content with the inclusion of either lead in or lead out sponsorships (e.g., commercials before or after the presentation of the traffic information or weather information).

Being that there are times at which the user prefers to focus on the music, flexibility of the settings enables the user to define that he wants only alerts delivered, and not ordinary or routine news information. Alerts are not part of the station playlist, and may be allowed to "barge in" and pause the currently playing music. This is a network based "push" audio notification, similar in principle to an emergency broadcast alert.

Based on context-based personalization, this capability may be extended to the in-vehicle content consumption experience. By monitoring the usage patterns across all sources, a comprehensive set of contextual rules may be created for distinct, repeatable behavior within a given time slice. These learned behaviors may be used to dynamically adjust the content mix delivered by the system of the present invention. Additionally, the user may be enabled to express "likes" for any source accessible by the in-vehicle infotainment system to provide feedback and help deliver better recommendations.

If a preset touch button of the invention is defined to deliver traffic, news, weather, or some combination of these content types, the content may be delivered at the beginning of the playlist (e.g., immediately after engine ignition) and at predetermined intervals throughout the user's commute. Additionally, when the user returns to his car at the end of his workday and resumes his playlist, the current traffic, news, and weather may be delivered at the beginning of his commute (e.g., immediately after engine ignition) and his last played track may be resumed from the point he left off.

The invention comprises, in one form thereof, a user interface arrangement including a user interface having a plurality of movable sliders. Each of the sliders corresponds to a respective category of infotainment content. A processor is communicatively coupled to the user interface. The processor presents each of the categories of infotainment content in proportions dependent upon positions of the sliders.

The invention comprises, in another form thereof, a method of operating a vehicle user interface, including providing a user interface having a plurality of movable sliders. Each of the sliders corresponds to a respective category of audio infotainment content. Each of the categories of audio infotainment content is played in proportions dependent upon positions of the sliders.

The invention comprises, in yet another form thereof, a vehicle user interface arrangement including a user interface having a plurality of movable sliders. Each of the sliders corresponds to a respective category of infotainment content. A processor is communicatively coupled to the user interface. The processor presents each of the categories of infotainment content in proportions dependent upon positions of the sliders. The user interface enables a user to select one of the categories. The processor re-assigns each of the sliders to a respective type within the selected category of infotainment content. The processor senses movements of the sliders to new positions after each of the sliders has been re-assigned to a respective type within the selected category of infotainment content. The processor also presents each of the types of infotainment content in proportions dependent upon the new positions of the sliders.

When compared to traditional terrestrial/satellite broadcast or internet radio stations, the invention has several advantages. The present invention has the advantage of delivering the information that the user wants when the information matters most to the user. The information is often most valuable as the user begins his commute. The invention enables information content to be delivered on the user's schedule or on demand, rather than in a preprogrammed, asynchronous manner unrelated to the user's needs. The invention also enables the delivery of push based audio alerts which overrides and interrupts the current station content. Finally, the invention enables delivery of on demand information (traffic, weather, news, etc.).

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

Glossary

User Interface—everything on an information device with which a human being may interact.

Slider—A physical or virtual control on a user interface that can be slid, or that can be virtually slid.

Infotainment—Information-based and/or entertainment-based media content or programming.

Processor—An apparatus that processes something.

The embodiments hereinafter disclosed are not intended to be exhaustive or limit the invention to the precise forms disclosed in the following description. Rather the embodiments are chosen and described so that others skilled in the art may utilize its teachings.

Figure 1:
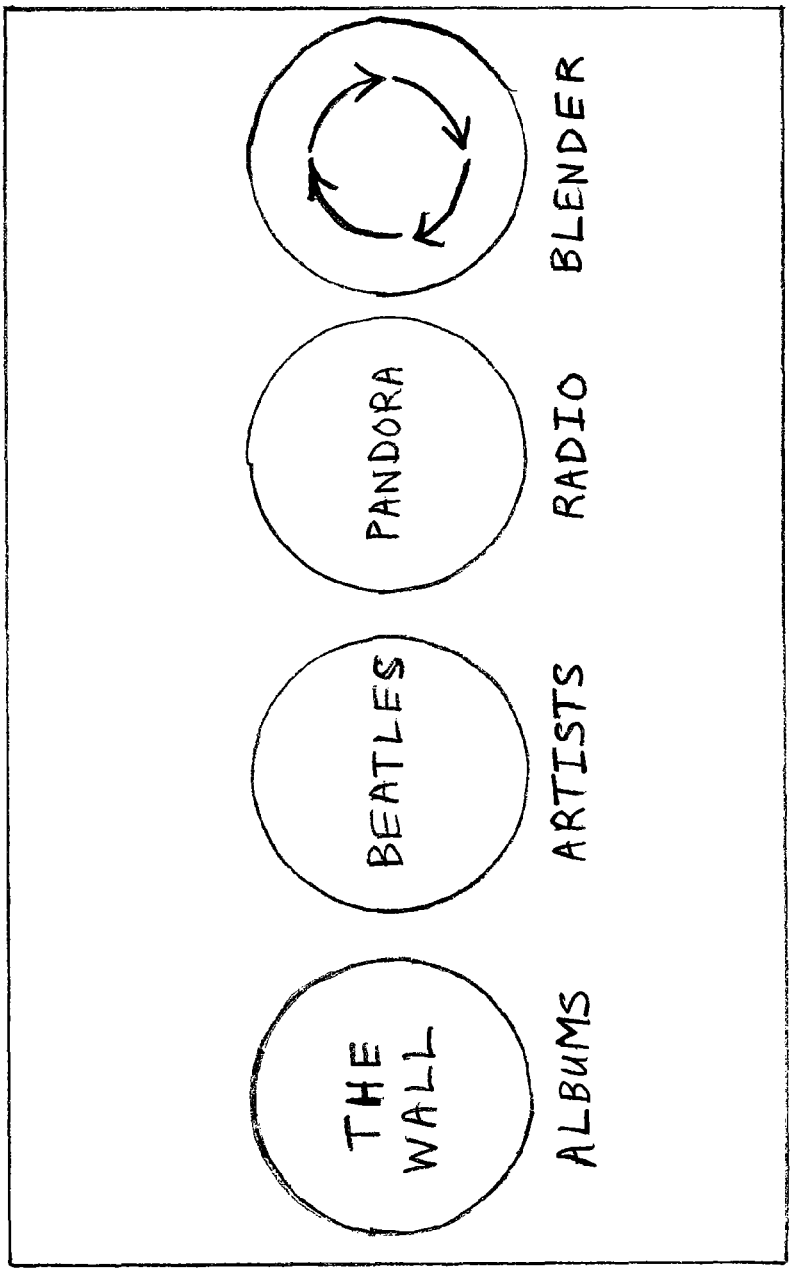
FIG. 1 is an example screen shot of a home screen of a user interface of the present invention.

One embodiment of a configuration screen 100 of a user interface of the invention is shown in FIG. 1. Configuration screen 100 includes a set of four icons from which the user may select, including "ALBUMS", "ARTISTS", "RADIO", and "BLENDER". The user pressing the "BLENDER" icon implements the method of the invention, and the Main View display screen 200 shown in FIG. 2. The Main View display screen includes content category rotary sliders 202a-e which a user may touch or press with his finger, as indicated at 204, and individually virtually slide each of sliders 202a-e in circumferential directions 206. Sliders 202a-e are not physical sliders, but rather are virtual sliders electronically displayed on screen 200. By virtually sliding sliders 202a-e, the user may change the circumferential arcuate length of each of sliders 202a-e that is visible to the user. For example, as shown in the specific configuration of FIG. 2, the ratio of the length of sliders 202a-e that is exposed and visible to the user is approximately 50:50:50:90:90. That is, each of sliders 202a-c spans about fifty degrees of a circle, and each of sliders 202d-e spans about ninety degrees of a circle.

Sliders 202a-e may be moved to thereby adjust how information and music is fed. That is, the relative positions of sliders 202a-e may determine in what proportions or percentages the content in Categories A-E are presented to the user. For example, slider 202a may be moved in order to adjust the amount of traffic information received, or percentage of total listening time that traffic information is played; slider 202b may be moved in order to adjust the amount of weather information received, or percentage of total listening time that weather information is played; slider 202c may be moved in order to adjust the amount of news information received, or percentage of total listening time that news information is played; slider 202d may be moved in order to adjust the amount of local music played, or percentage of total listening time that local music is played; and slider 202e may be moved in order to adjust the amount of streamed content received, or percentage of total listening time that streamed content is played. Alerts may be enabled by selecting check box 208.

Information (i.e., traffic, weather and news) feed categories A-C can be disabled by minimizing their size. This minimization may be accomplished by touching the respective one of sliders 202a-c and dragging the slider in the counter-clockwise direction. Sliders D-E may be used to adjust the music discovery/data consumption management (e.g., the proportion of local music content to streamed content). Particularly, the balance between local and streamed content may be controlled by moving slider 202d. Specifically, moving slider 202d in a clockwise direction towards slider 202e (e.g., as indicated at 210) may increase the amount of local music content used, while also decreasing the amount of music discovery and data consumption. That is, moving slider 202d in a clockwise direction towards slider 202e may increase the amount of local music content played relative to the amount of streamed content played. Conversely, moving slider 202d in a counter-clockwise direction towards slider 202c (e.g., as indicated at 212) may decrease the amount of local music content used, while increasing the amount of music discovery and data consumption. That is, moving slider 202d in a counter-clockwise direction towards slider 202c may decrease the amount of local music content played relative to the amount of streamed content played.

Figure 3:
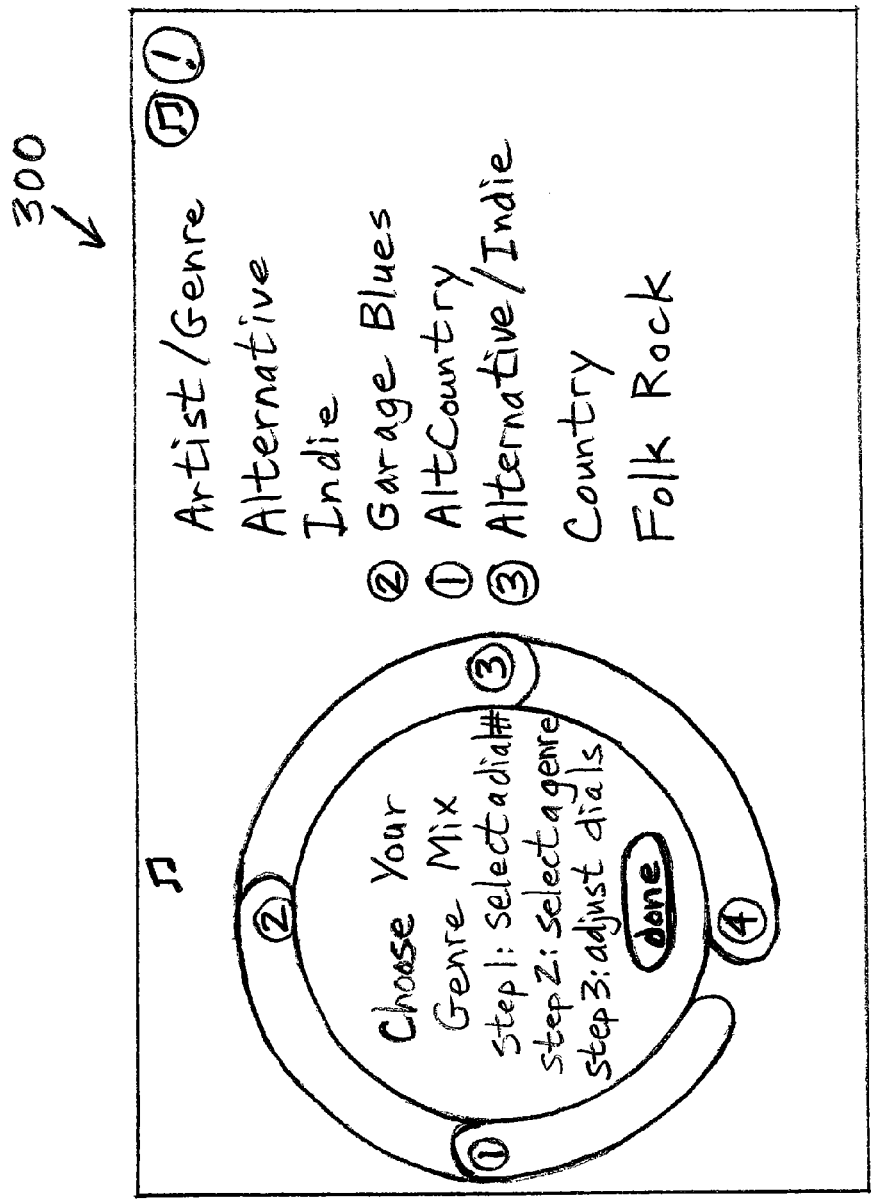
FIG. 3 is an example screen shot of a local content mix view display screen of the present invention.
Figure 4:
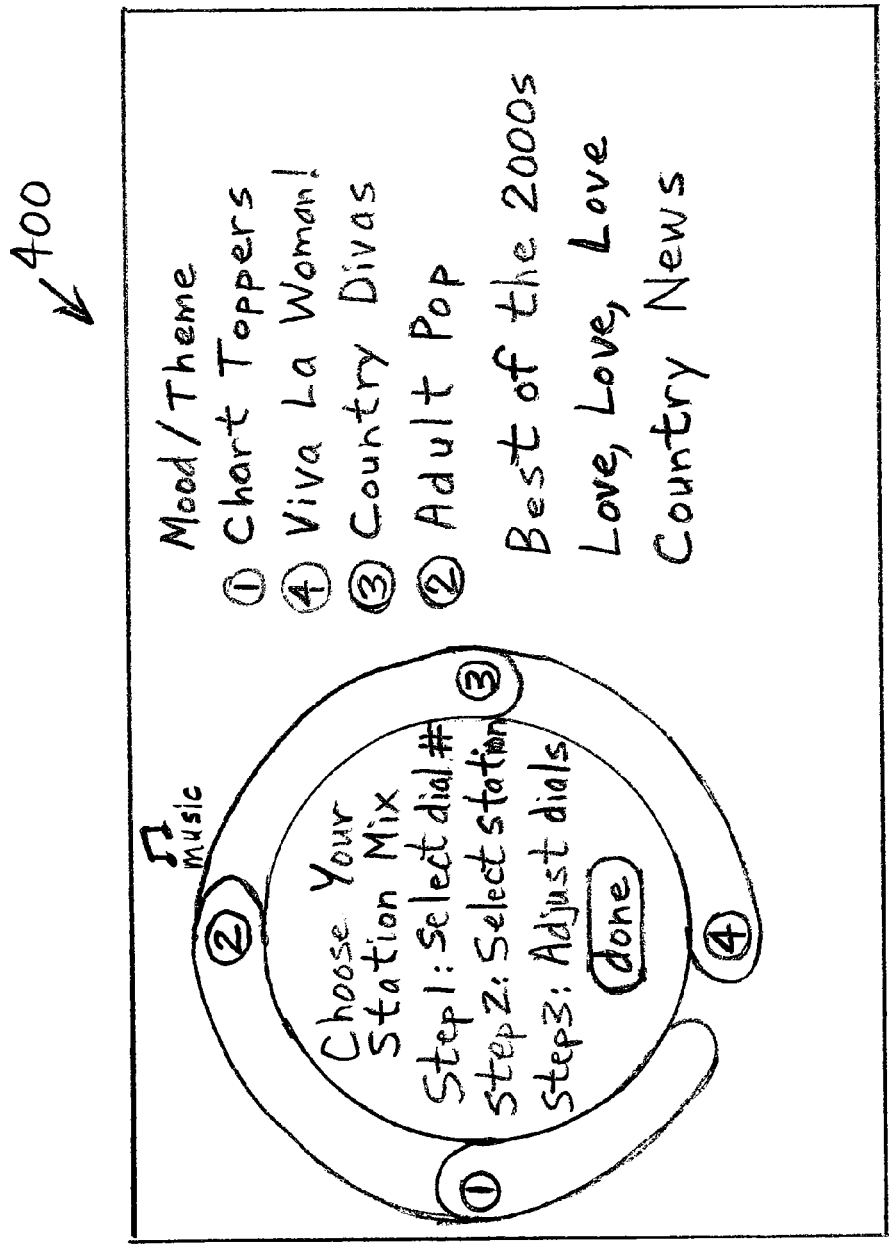
FIG. 4 is an example screen shot of a streamed content mix view display screen of the present invention.

A Local Content Mix View display screen 300 is shown in FIG. 3. This Local Content Mix View display screen 300 may be displayed as a result of the user touching a local music icon (e.g., the music note) in Main View screen 200 or in a Streamed Content Mix View display screen 400 shown in FIG. 4. The user may select the local content by selecting/touching a desired control point (e.g., one of control points 1, 2, 3, 4 on the rotary dial); selecting either "Artist" or "Genre" from the list header; selecting either the artist or genre from the list; and repeating this process for additional control points. The user may adjust the local content balance by moving the position of control points 1, 2 and 3, which determines the amount of content contributed by each artist or genre. Minimizing a slider 202a-e may disable the related artist or genre.

Figure 2:
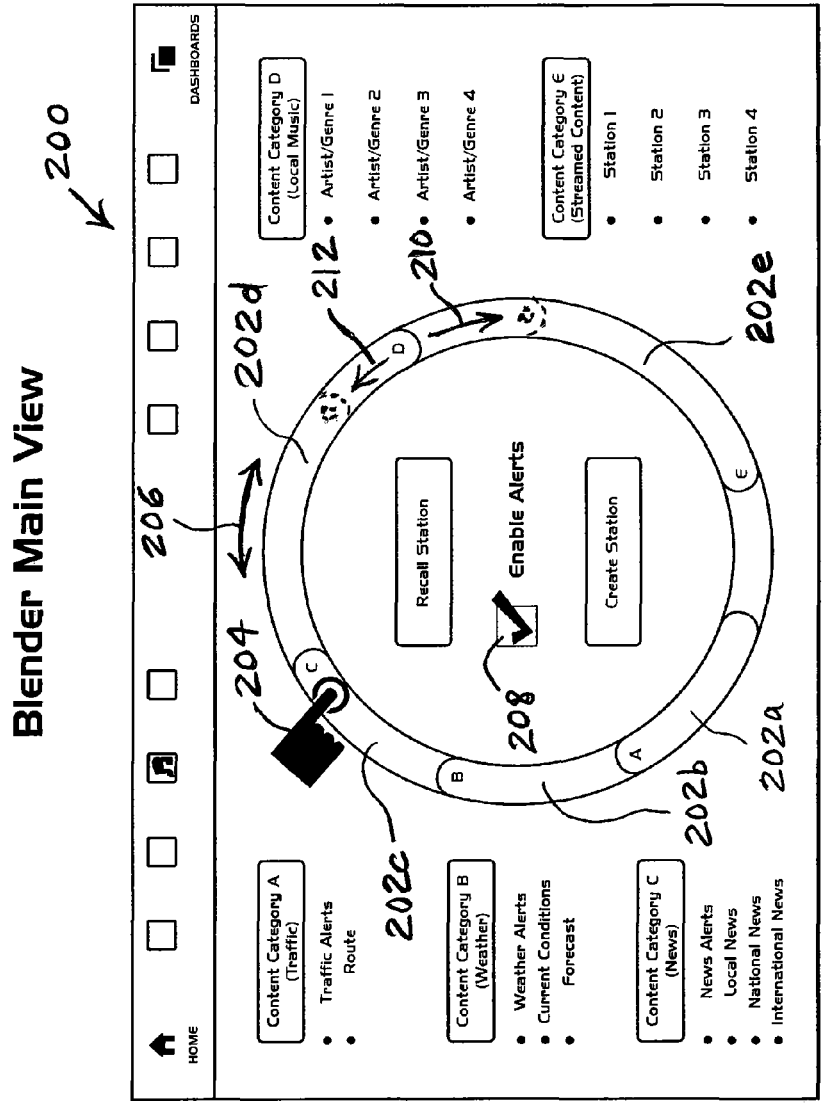
FIG. 2 is an example screen shot of a main view display screen of a user interface of the present invention.

The Streamed Content Mix View display screen 400 may be displayed as a result of the user touching a streamed music icon (e.g., the exclamation icon) in the Main View display screen 200 of FIG. 2 or the Local Content Mix View display screen 300 of FIG. 3. The user may select the streamed content by selecting/touching a desired control point (e.g., one of control points 1, 2, 3, 4 on the rotary dial); selecting either "Mood" or "Theme" from the list header; selecting either a station with a selected mood or a station with a selected theme from the list; and repeating this process for additional control points. The user may adjust the station balance by moving the position of control points 1, 2 and 3, which determines the amount of content contributed by each station. Minimizing a slider 202a-e may disable the related station.

Figure 5:
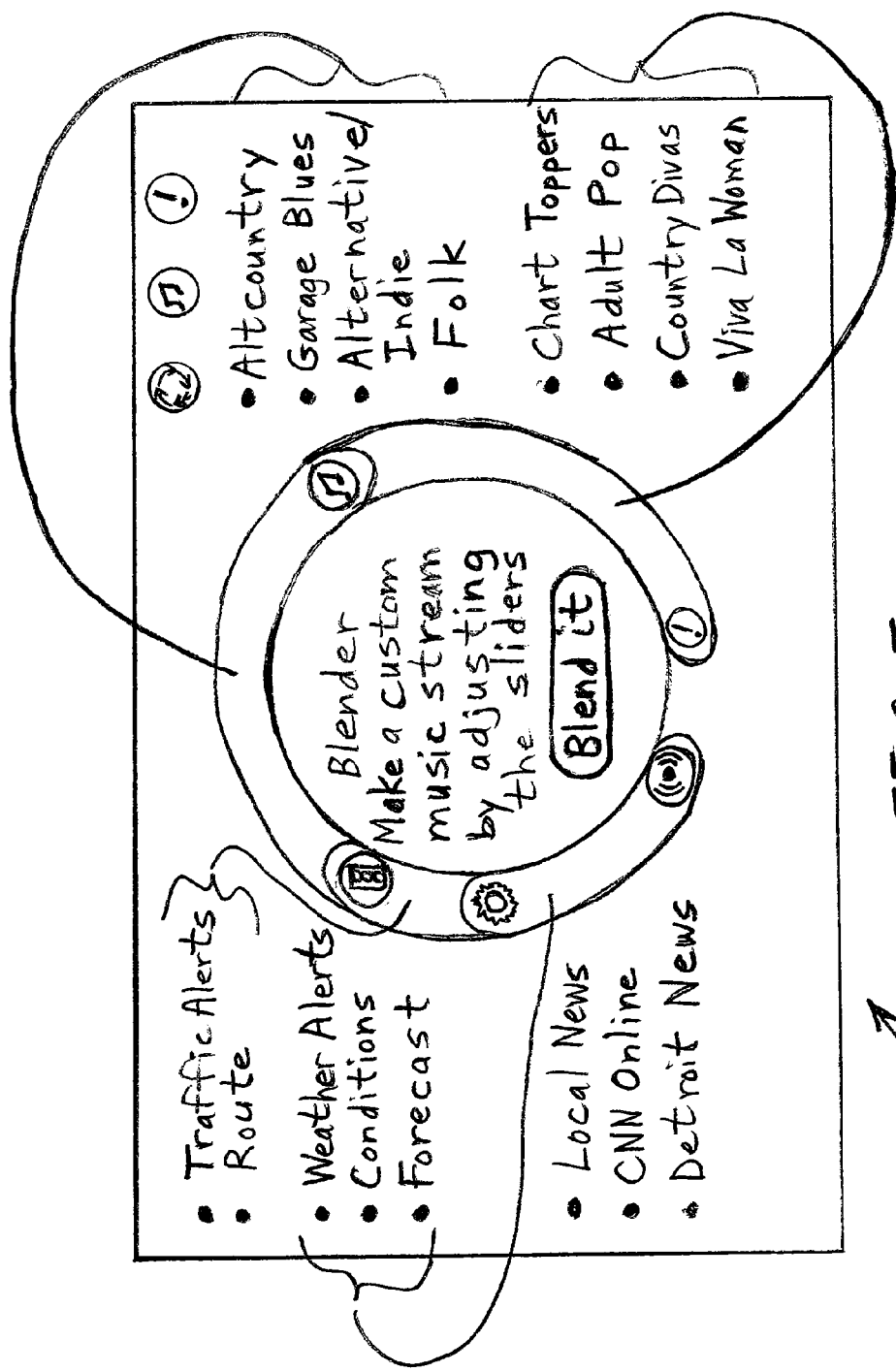
FIG. 5 is an example screen shot of the main view display screen of FIG. 2 after the user has made adjustments.

A Main View display screen 500 after the user has made adjustments is shown in FIG. 5. The news information feed, including "Local News", "CNN Online", and "Detroit News", has been disabled by minimizing the related rotary slider 202. The four remaining rotary sliders, proceeding in a clockwise direction from the bottom, correspond to weather ("Weather Alerts", "Conditions" and "Forecast"), traffic ("Traffic Alerts", "Route"), local music ("Altcountry", "Garage Blues", "Alternative/Indie" and "Folk"), and streamed content ("Chart Toppers", "Adult Pop", "Country Divas" and "Viva La Woman"). After the user has adjusted the rotary sliders to reflect his preferences, he may touch the "BLEND IT" icon near the middle of the screen to thereby create a custom station.

Figure 6:
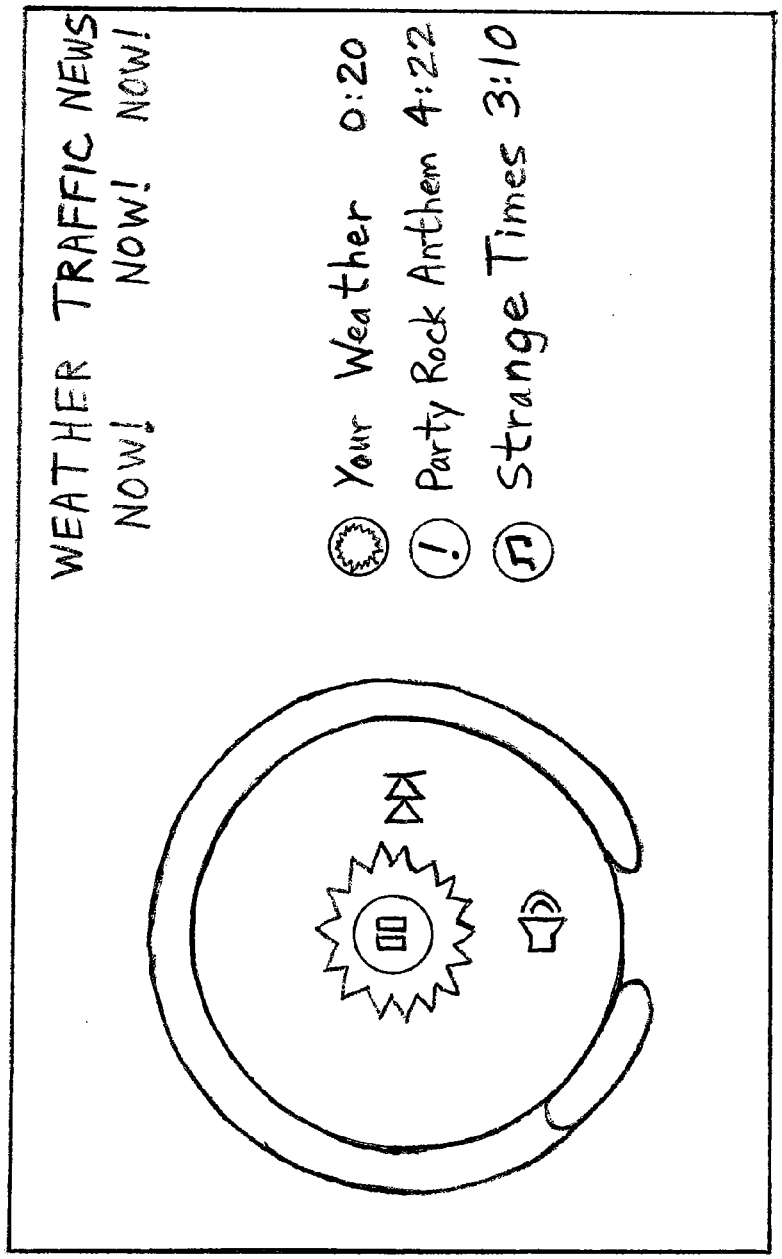
FIG. 6 is an example screen shot of a playlist view display screen of the present invention.

A Playlist View display screen 600 after the user has made adjustments is shown in FIG. 6. Information feeds can be requested on demand by touching the "WEATHER NOW!", "TRAFFIC NOW!", and "NEWS NOW!" touch buttons or icons. For example, weather information may be played immediately in response to the user touching the "WEATHER NOW!" touch button.

The user interface of the present invention may provide a user with more control over the listening experience. The invention may enable the user to combine multiple stations into a single, combined, personalized station stream. The invention may also enable the user to create his own custom radio station from various music, news, weather, and traffic feeds. The listener may create his custom radio station by adjusting the settings, selecting from a variety content categories, creating the desired variety of content. The end result is a flowing radio experience that is dialed right into the user's preferences.

Users may create a custom "radio station" based on a combination of local and streamed audio content using the following criteria: a) information content category priority (music/news/weather/traffic and local information); b) discovery control to set the balance of local music and streamed content; and c) streaming music mashup which controls the blending of multiple stations (e.g., limit the scope to the existing stations within the user profile).

The interface for this feature may combine design elements and interface methods from the Dashboard Configurator and Climate Control full screen views. There may be three main interfaces to control the content mix: a) added information: enables the user to add local traffic/news/weather to his listening experience. A rotary slider adjusts the frequency of information content delivery for the various categories relative to music content; b) discovery: enables the user to adjust level of discovery and playback of internet radio content. Adjusting the slider to the home position may limit playback to local content while adjusting the slider to the globe position may deliver only internet radio content; and c) net mix: enables the user to control how much each of the selected stations may contribute to the "discovered" content. Upon creating the blended station profile, there may be an accompanying animation progress indicator and associated sound effect. Once the station is "created", playback of a random track from the current user's library may begin playback of a mix of local and station content.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle user interface arrangement, comprising:
a vehicle display touch screen displaying a user interface including a plurality of movable virtual sliders, each of the sliders corresponding to a respective category of a plurality of categories of infotainment content, each of the sliders being movable in two opposite circumferential directions,
the user interface configured such that a first category may be selected in response to a touch input, and each of the sliders may be re-assigned to a respective type of a plurality of types within the selected category of infotainment content;
the user interface further configured such that a second category may be selected to be presented immediately after engine ignition regardless of which of the categories of infotainment was being presented at the last time the engine ignition was previously on; and
a processor communicatively coupled to the vehicle display touch screen, the processor being configured to present each of the categories and each of the types of infotainment content in proportions dependent upon circumferential lengths of visible portions of the sliders.

2. The arrangement of claim 1 wherein each of the sliders may be assigned to a respective said category of infotainment content by a user touching the user interface.

3. The arrangement of claim 1 wherein the user interface includes a virtual touch button which causes a respective said category of the infotainment to be immediately presented to the user.

4. A method of operating a vehicle user interface, said method comprising the steps of:
providing a user interface including a plurality of movable virtual sliders on a vehicle touch screen display controlled by a processor, each of the sliders corresponding to a respective category of a plurality of categories of audio infotainment content, each of the sliders being movable in two opposite circumferential directions; and
playing each of the categories of audio infotainment content in proportions dependent upon circumferential lengths of visible portions of the sliders;
wherein the user interface is further configured such that a first category may be selected in response to a touch input, and each of the sliders may be re-assigned to a respective type of a plurality of types within the selected category of infotainment content; and
wherein the user interface is further configured such that a second category may be selected to be presented immediately after engine ignition regardless of which of the categories of infotainment was being presented at the last time the engine ignition was previously on.

5. The method of claim 4 wherein the user interface includes a virtual touch button, the method comprising the further step of immediately presenting a respective said category of the infotainment to the user in response to the user touching the virtual touch button.

6. The method of claim 4 wherein the sliders are coincident on a same circumference.

7. The method of claim 6 wherein the sliders conjunctively span approximately between 300 degrees and 360 degrees of a circle.

* * * * *